（12) United States Patent
Yamada

(10) Patent No.: US 12,271,125 B2
(45) Date of Patent: Apr. 8, 2025

(54) DEVELOPING DEVICE AND IMAGE FORMING APPARATUS PROVIDED THEREWITH

(71) Applicant: KYOCERA Document Solutions Inc., Osaka (JP)

(72) Inventor: Ryo Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/565,738

(22) PCT Filed: Mar. 28, 2022

(86) PCT No.: PCT/JP2022/014853
§ 371 (c)(1),
(2) Date: Nov. 30, 2023

(87) PCT Pub. No.: WO2022/254915
PCT Pub. Date: Dec. 8, 2022

(65) Prior Publication Data
US 2024/0255867 A1    Aug. 1, 2024

(30) Foreign Application Priority Data

Jun. 4, 2021  (JP) .................. 2021-094278
Sep. 22, 2021  (JP) .................. 2021-153947

(51) Int. Cl.
*G03G 15/08*  (2006.01)
*B01D 39/16*  (2006.01)
*G03G 21/20*  (2006.01)

(52) U.S. Cl.
CPC ......... *G03G 15/0891* (2013.01); *B01D 39/16* (2013.01); *G03G 15/0898* (2013.01); *G03G 21/206* (2013.01)

(58) Field of Classification Search
CPC .............. G03G 15/08; G03G 15/0891; G03G 15/0893; G03G 15/0898; G03G 15/09; G03G 21/206
See application file for complete search history.

(56) References Cited

U.S. PATENT DOCUMENTS 6,281,961 B1  8/2001 Sako et al. .............. 355/27
9,458,879 B2 * 10/2016 Nakajima
(Continued)

FOREIGN PATENT DOCUMENTS

JP  H 11-202627 A   7/1999
JP  2002-278271 A   9/2002
(Continued)

*Primary Examiner* — Sophia S Chen
(74) *Attorney, Agent, or Firm* — Stein IP, LLC

(57) ABSTRACT

A developing device (3a-3d) is provided with a development container (20), a first stirring conveyance member (25), a second stirring conveyance member (26), and a developer carrier (31). The development container (20) has a first conveyance chamber (21), a second conveyance chamber (22), and a communication portion (20). The first stirring conveyance member (25) includes a first rotation shaft (23a) and a first stirring blade (24a). The second stirring conveyance member (26) includes a second rotation shaft (23b) and a second stirring blade (24b). The developer carrier (31) is opposed to the second stirring conveyance member (26). The first rotation shaft (23a) includes, at least in a partial region in an axial direction of the first rotating shaft (23a), a tapered portion (36) of which a shaft diameter increases toward a downstream side in a developer conveyance direction in the first conveyance chamber (21).

14 Claims, 11 Drawing Sheets

(56) References Cited

U.S. PATENT DOCUMENTS

| | | | |
|---|---|---|---|
| 2011/0318062 A1 | 12/2011 | Hayashi et al. | 399/254 |
| 2012/0328334 A1* | 12/2012 | Mihara | G03G 15/0893 |
| | | | 399/255 |
| 2014/0270817 A1 | 9/2014 | Ikebata | 399/27 |
| 2017/0343926 A1* | 11/2017 | Yago | |
| 2021/0109459 A1* | 4/2021 | Yamada | G03G 15/0891 |

FOREIGN PATENT DOCUMENTS

| | | |
|---|---|---|
| JP | 2011-158577 A | 8/2011 |
| JP | 2012-008257 A | 1/2012 |
| JP | 2013-231802 A | 11/2013 |
| JP | 2014-174495 A | 9/2014 |
| JP | 2020-095241 A | 6/2020 |

\* cited by examiner

DEVELOPING DEVICE AND IMAGE FORMING APPARATUS PROVIDED THEREWITH

CROSS-REFERENCE TO RELATED APPLICATIONS

This application is a national stage of International Application No. PCT/JP2022/014853, filed Mar. 28, 2022, which claims the benefit of Japanese Application No. 2021-094278, filed Jun. 4, 2021 and Japanese Application No. 2021-153947, filed Sep. 22, 2021, in the Japanese Patent Office, the disclosures of which are incorporated herein by reference.

TECHNICAL FIELD

The present invention relates to a fixing device and an image forming apparatus provided therewith.

BACKGROUND ART

Image forming apparatuses employing an electro-photographic method, such as copiers, printers, facsimile machines, and a multifunction peripheral having functions of these, are provided with a developing device for forming a toner image (a visible image) by developing, or by visualizing, an electrostatic latent image formed on an outer circumferential surface of an image carrier.

Examples of such image forming apparatuses include one disclosed in Patent Document 1 identified below, which includes a development container in which a developer including a toner is stored, a stirring conveyance member that stirs and conveys the developer in the development container, and a development roller that is partly exposed through an opening formed in the development container (Patent Document 1). The development container includes a first conveyance chamber and a second conveyance chamber. The stirring conveyance member is disposed in each of the first and second conveyance chambers.

The stirring conveyance member includes a rotation shaft rotatably supported in the development container and a stirring blade formed on an outer circumference surface of the rotation shaft. The rotation shaft is supported by a bearing portion provided in the developing device, and is supported so as to be rotatable. The stirring blade rotates about the rotation shaft, and thereby the developer stored in the development container is supplied to the development roller while being circulated inside the development container.

CITATION LIST

Patent Literature

Patent Document 1: Japanese unexamined patent application publication No. 2002-278271

SUMMARY OF INVENTION

Technical Problem

In the case of a two-component developing device, for example, when dense images are continuously developed, a large amount of toner is consumed and thus a large amount of toner is supplied to the development container at one time. As a result, the supplied toner is not sufficiently stirred inside the development container, so that toner concentration (the mix ratio of toner to carrier in developer; T/C) around a toner supply portion (around the most upstream-side part of the development container with respect to a developer conveyance direction) becomes higher than in other parts. This may invite unevenness density in an image formed. Further, since the toner and the career in the development container are not sufficiently stirred, the toner is unlikely to be suitably charged. This may invite so-called background fogging, or may cause the insufficiently charged toner to scatter to stain an interior of an image forming apparatus.

An object of the present invention is to provide a developing device capable of suppressing insufficient stirring of a developer in a development container.

Solution to Problem

To achieve the above object, according to a first structure of the present invention, a developing device includes a development container, a first stirring conveyance member, a second stirring conveyance member, and a developer carrier. The development container includes a first conveyance chamber, a second conveyance chamber that is disposed side by side with the first conveyance chamber with a partition portion therebetween, and a communication portion that establishes communication between the first conveyance chamber and the second conveyance chamber at opposite end part sides of the partition portion in a longitudinal direction thereof, the development container stores a developer including a toner. The first stirring conveyance member includes a first rotation shaft rotatably supported in the first conveyance chamber and a first stirring blade formed on an outer circumferential surface of the first rotation shaft, and the first stirring conveyance member stirs and conveys the developer in the first conveyance chamber. The second stirring conveyance member includes a second rotation shaft rotatably supported in the second conveyance chamber and a second stirring blade formed on an outer circumferential surface of the second rotation shaft, and the second stirring conveyance member stirs and conveys the developer in the second conveyance chamber. The developer carrier is opposed to the second stirring conveyance member, and carries on a surface thereof toner in the second conveyance chamber. The first rotation shaft has, at least in a partial region in an axial direction of the first rotation shaft, a tapered portion of which a shaft diameter increases toward a downstream side in a developer conveyance direction in the first conveyance chamber.

Advantageous Effects of the Invention

According to the first configuration of the present invention, since the first rotation shaft has the tapered portion, a volume of the first conveyance chamber becomes smaller from upstream to downstream. That is, an amount of developer that the first stirring conveyance member can convey gradually decreases from upstream to downstream in the developer conveyance direction. Thus, the developer inside the first conveyance chamber is pushed back upstream while it is conveyed downstream. As a result, the developer is sufficiently stirred inside the first conveyance chamber, and the sufficiently stirred developer is conveyed to the second conveyance chamber. Accordingly, it is possible to provide a developing device capable of suppressing insufficient stirring of developer inside a development container.

DESCRIPTION OF EMBODIMENTS

Hereinafter, with reference to the accompanying drawings, a description will be given of developing devices 3a to 3d of the present invention, and an image forming apparatus 100 that includes the developing devices 3a to 3d according to a first embodiment.

Figure 1:
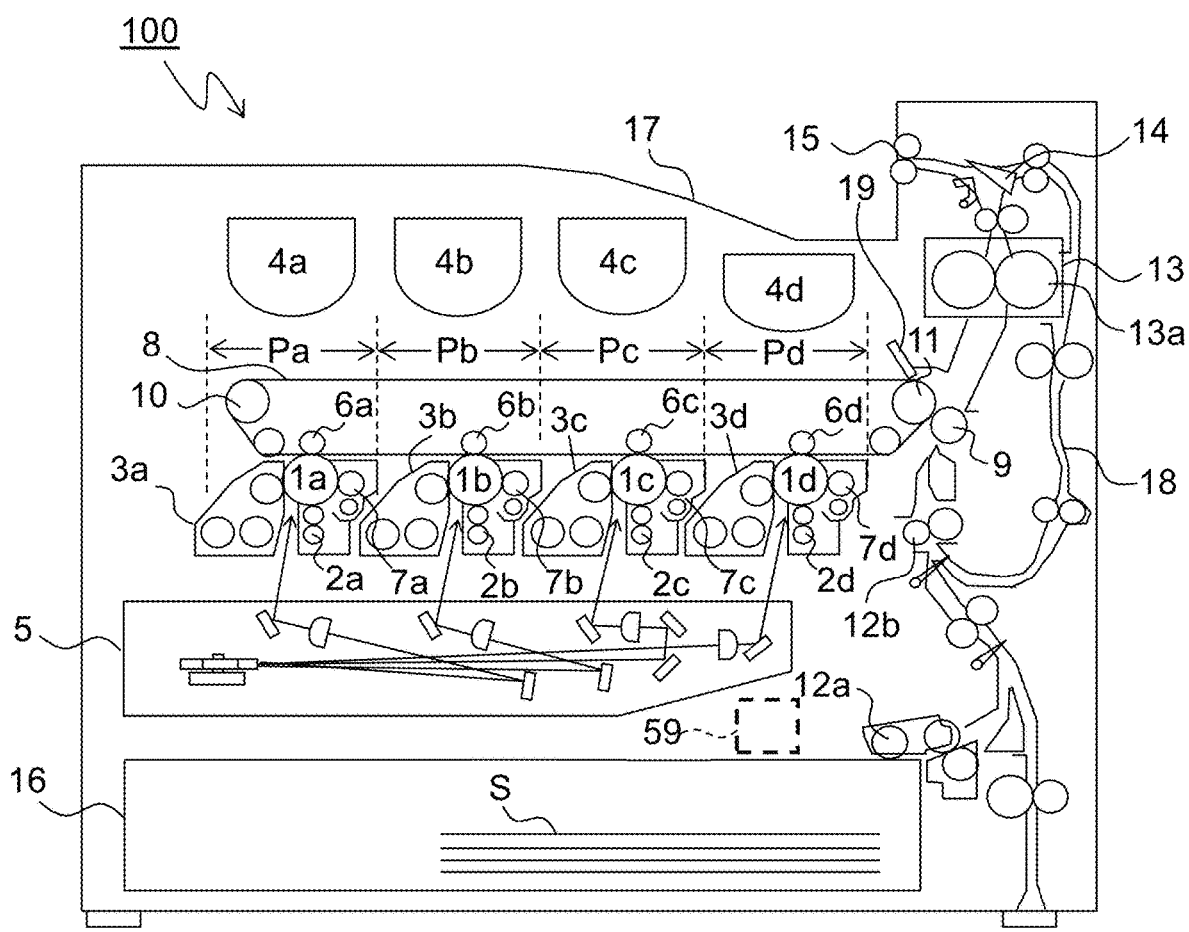
FIG. 1 is a sectional view showing an internal structure of an image forming apparatus 100 in which developing devices 3a to 3d according to a first embodiment of the present invention are incorporated.

FIG. 1 is a sectional view showing an internal structure of the image forming apparatus 100 in which the developing devices 3a to 3d according to the first embodiment of the present invention are incorporated. In the image forming apparatus 100 (here, a color printer), in a main body thereof, four image forming portions Pa, Pb, Pc, and Pd are arranged in this order from an upstream side in a conveyance direction (a left side in FIG. 1). These image forming portions Pa to Pd are provided corresponding to images of four different colors (cyan, magenta, yellow, and black), and sequentially form images of cyan, magenta, yellow, and black through charging, exposure, developing, and transfer processes.

These image forming portions Pa to Pd are respectively provided with photoconductive drums (image carriers) 1a, 1b, 1c, and 1d, which each carry a visible image (a toner image) of a corresponding one of the different colors, and further, an intermediate transfer belt 8 formed as an endless belt that rotates in a counterclockwise direction in FIG. 1 is provided adjacent to the image forming portions Pa to Pd. The toner images formed on the photoconductive drums 1a to 1d are primarily transferred sequentially to the intermediate transfer belt 8, which moves while in contact with the photoconductive drums 1a to 1d, to be superimposed one on another. Thereafter, the toner images having been primarily transferred to the intermediate transfer belt 8 are secondarily transferred by a secondary transfer roller 9 onto a transfer sheet S as one example of a recording medium. Further, the transfer sheet S having the secondarily transferred toner images thereon has the toner images fixed thereon at a fixing portion 13, and is then discharged out of the main body of the image forming apparatus 100. An image forming process is executed with respect to the photoconductive drums 1a to 1d while rotating the photoconductive drums 1a to 1d in a clockwise direction in FIG. 1 by means of a main motor (unillustrated).

The transfer sheet S onto which the toner images are to be secondarily transferred is stored in a sheet cassette 16 disposed in a lower part of the main body of the image forming apparatus 100, and is conveyed, via a sheet feeding roller 12a and a pair of registration rollers 12b, to a nip portion formed between the secondary transfer roller 9 and a driving roller 11 of the intermediate transfer belt 8. Used as the intermediate transfer belt 8 is a dielectric resin sheet, typically a (seamless) belt with no seam. On a downstream side of the secondary transfer roller 9, there is disposed a blade-shaped belt cleaner 19 for removing toner and the like left on the surface of the intermediate transfer belt 8.

Next, the image forming portions Pa to Pd will be described. Around and below the photoconductive drums 1a to 1d, which are arranged rotatably, there are provided charging devices 2a, 2b, 2c, and 2d which charge the photoconductive drums 1a to 1d, an exposure device 5 which exposes the photoconductive drums 1a to 1d to light conveying image information, developing device 3a, 3b, 3c, and 3d which form toner images on the photoconductive drums 1a to 1d, and cleaning devices 7a, 7b, 7c, and 7d which remove developer (toner) and the like left on the photoconductive drums 1a to 1d.

Upon image data being inputted from a host device such as a personal computer, first, charging devices 2a to 2d uniformly charge surfaces of the photoconductive drums 1a to 1d. Then, the exposure device 5 irradiates the photoconductive drums 1a to 1d with light corresponding to the image data, so that electrostatic latent images are formed on the photoconductive drums 1a to 1d corresponding to the image data. The developing devices 3a to 3d are each filled with a predetermined amount of two-component developer including a cyan, magenta, yellow, or black toner. In a case where, due to toner image formation, which will be described later, a proportion of toner in the two-component developer loaded in each of the developing devices 3a to 3d has fallen below a prescribed value, the developing devices 3a to 3d are each supplied with fresh toner from corresponding one of toner containers 4a to 4d. The toner included in the developer is supplied by each of the developing devices 3a to 3d onto a corresponding one of the photoconductive drums 1a to 1d to electrostatically adhere thereto, and thereby a toner image is formed corresponding to the electrostatic latent image having been formed by exposure to light from the exposure device 5.

Then, by primary transfer rollers 6a to 6d, an electric field is applied at a predetermined transfer voltage between the primary transfer rollers 6a to 6d and the photoconductive drums 1a to 1d, and toner images of cyan, magenta, yellow, and black on the photoconductive drums 1a to 1d are primarily transferred onto the intermediate transfer belt 8. These images of the four different colors are formed in a predetermined positional relationship with each other determined in advance for formation of a predetermined full-color image. Thereafter, in preparation for a subsequent formation of new electrostatic latent images, residual toner and the like left on the surfaces of the photoconductive drums 1a to 1d after the primary transfer are removed by the cleaning devices 7a to 7d.

The intermediate transfer belt 8 is wound around and between a driven roller 10 on an upstream side and a driving roller 11 on a downstream side; as the intermediate transfer belt 8 starts to rotate counterclockwise along with rotation of the driving roller 11 caused by the belt driving motor (unillustrated), the transfer sheet S is conveyed from the pair of registration rollers 12b, with predetermined timing, to the nip portion (a secondary transfer nip portion) formed between the driving roller 11 and the secondary transfer roller 9 provided adjacent thereto, and the full-color image on the intermediate transfer belt 8 is secondarily transferred onto the transfer sheet S. The transfer sheet S onto which the toner images have been secondarily transferred is conveyed to the fixing portion 13.

The transfer sheet S conveyed to the fixing portion 13 is heated and pressed by a pair of fixing rollers 13a, so that the toner images are fixed on the surface of the transfer sheet S, and thereby the predetermined full-color image is formed thereon. The transfer sheet S having the full-color image formed thereon has its conveyance direction switched via a branch portion 14 branching into a plurality of directions, so that the transfer sheet S is discharged as it is (or after being sent into a duplex-printing conveyance path 18 and then subjected to duplex printing) onto a discharge tray 17 by a pair of discharge rollers 15.

Figure 2:
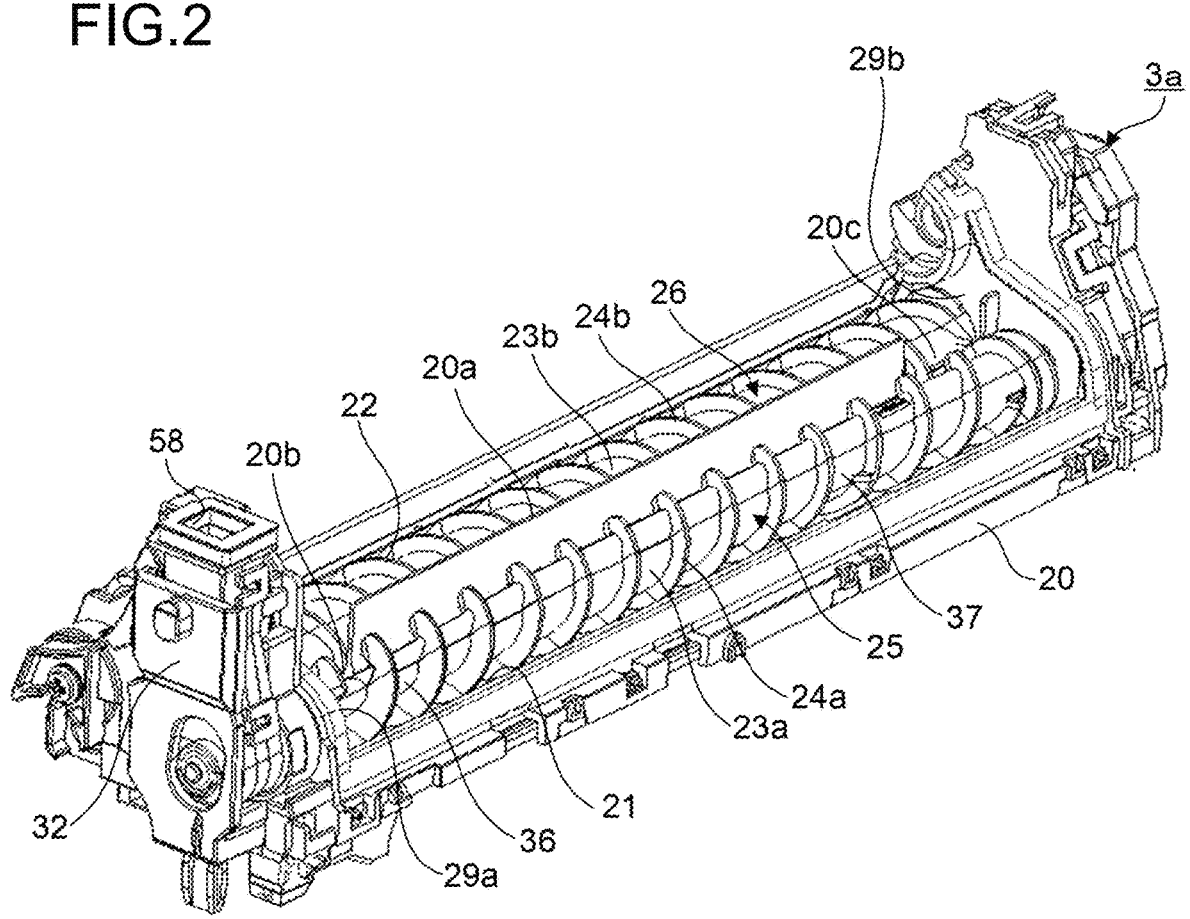
FIG. 2 is a perspective view showing the developing device 3a with a cover member 61 and a development roller 31 detached therefrom.
Figure 3:
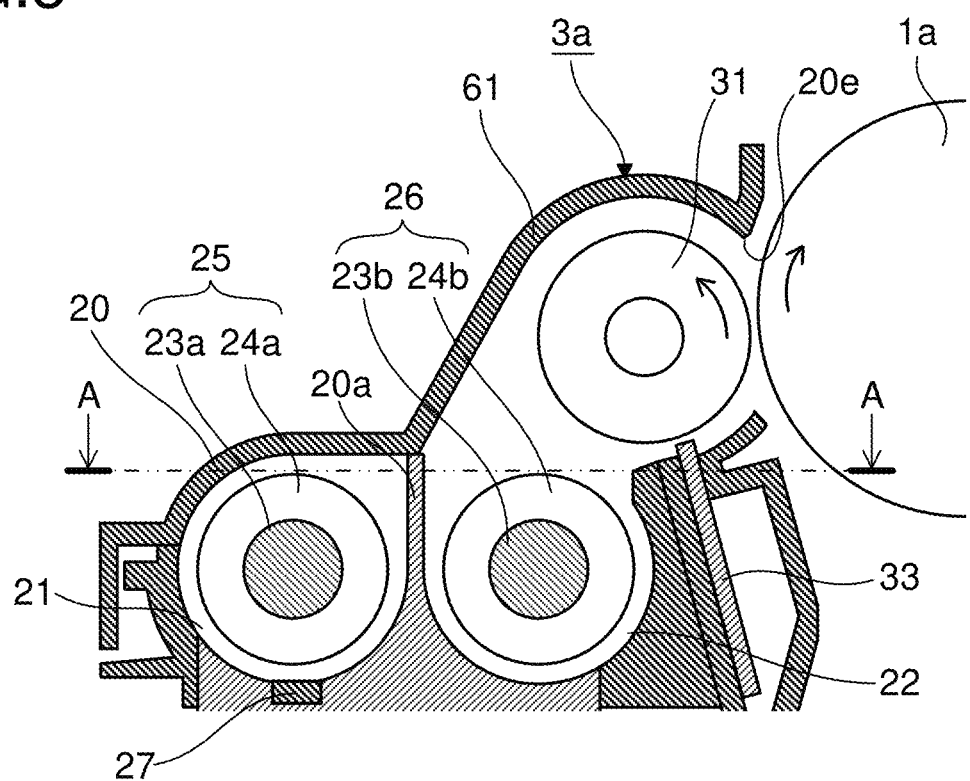
FIG. 3 is a side sectional view showing the developing device 3a with the cover member 61 and the development roller 31 attached thereto.

FIG. 2 is a perspective view showing the developing device 3a with a cover member 61 and a development roller 31 detached therefrom. FIG. 3 is a side sectional view showing the developing device 3a with the cover member 61 and the development roller 31 attached thereto. While the following description deals with, as an example, the developing device 3a arranged in the image forming portion Pa shown in FIG. 1, the developing devices 3b to 3d arranged in the image forming portions Pb to Pd have basically the same configuration, and therefore no overlapping description will be repeated.

As shown in FIGS. 2 and 3, the developing device 3a includes a development container 20 in which there is stored a two-component developer (hereinafter also referred to simply as a developer) including a magnetic carrier and a toner. The development container 20 includes a stirring conveyance chamber 21 (a first conveyance chamber), a supply conveyance chamber 22 (a second conveyance chamber), a partition wall 20a, communication portions 20b and 20c, the cover member 61, and a toner supply portion 32.

The stirring conveyance chamber 21 and the supply conveyance chamber 22 are disposed side by side. The partition wall 20a is provided in an inside of the development container 20 so as to separate the inside of the development container 20 into the stirring conveyance chamber 21 and the supply conveyance chamber 22. The communication portions 20b and 20c, at opposite end parts of the partition wall 20a in a longitudinal direction thereof, establish communication between the stirring conveyance chamber 21 and the supply conveyance chamber 22. The cover member 61 covers an upper part of the development container 20 so as to separate an internal space of the development container 20 from an external space thereof.

In the stirring conveyance chamber 21 and the supply conveyance chamber 22, there are rotatably disposed a first stirring conveyance member 25 and a second stirring conveyance member 26, respectively, for mixing and stirring toner supplied from a toner container 4a (see FIG. 1) with the magnetic carrier to charge the toner. The first stirring conveyance member 25 and the second stirring conveyance member 26 are, via shaft support portions (of which illustration is omitted) provided at opposite end parts in axial directions thereof, rotatably supported by bearing portions (of which illustration is omitted) fixed to the development container 20.

By the first stirring conveyance member 25 and the second stirring conveyance member 26 rotating, the developer is conveyed, while being stirred, in the axial directions (directions perpendicular to the plane of the sheet on which FIG. 3 is drawn), to circulate between the stirring conveyance chamber 21 and the supply conveyance chamber 22 via the communication portions 20b and 20c formed at the opposite end parts of the partition wall 20a. That is, in the developing container 20, a circulation path of the developer is formed by the stirring conveyance chamber 21, the supply conveyance chamber 22, and the communication portions 20b and 20c.

As shown in FIG. 3, inside the development container 20, to the diagonally upper right of the second stirring conveyance member 26 provided in the supply conveyance chamber 22, the development roller (a developer carrier) 31 is disposed. Part of an outer circumferential surface of the development roller 31 is exposed through an opening 20e of the development container 20 to be opposed to the photoconductive drum 1a. The development roller 31 rotates in a counterclockwise direction in FIG. 3. The first stirring conveyance member 25, the second stirring conveyance member 26, and the development roller 31 are caused to rotate at a predetermined rotation speed by driving force transmitted from a main motor (unillustrated).

The development roller 31 is composed of a development sleeve (unillustrated) having a cylindrical shape rotatable in the counterclockwise direction in FIG. 3, and a magnet (unillustrated) having a plurality of magnetic poles that is fixed inside the development sleeve. While the development sleeve used here has a knurled surface, it is also possible to use a development sleeve having a surface with a multitude of concaves (dimples) formed therein, a development sleeve having a blasted surface, or even a development sleeve having a surface not only knurled or including concaves formed therein but also blasted or plated.

As shown in FIG. 3, in the development container 20, a regulation blade 33 is attached along a longitudinal direction of the development roller 31 (a direction perpendicular to the plane of the sheet on which FIG. 3 is drawn). Between a leading edge of the regulation blade 33 and a surface of the development roller 31, a slight clearance (gap) is formed. The regulation blade 33, with this slight clearance, regulates a layer thickness of toner supplied onto the outer circumferential surface of the development roller 31 to a predetermined thickness.

To the developing device 3a, via a voltage control circuit (unillustrated), a development voltage power supply (unillustrated) is connected. By the development voltage power supply, a development voltage obtained by superimposing a direct current voltage and an alternate current voltage is applied to the development roller 31. The development voltage and magnetic force of the magnet inside the development roller 31 cause the developer to adhere to (be carried on) the surface of the development roller 31 to form a magnetic brush.

As shown in FIG. 3, in a bottom surface of the stirring conveyance chamber 21, a toner concentration sensor 27 is disposed so as to be opposed to the first stirring conveyance member 25 in a height direction (an up-down direction in FIG. 3). The toner concentration sensor 27 is located at a predetermined position (at which toner concentration is highest) in a developer conveyance direction in the stirring conveyance chamber 21 (see FIG. 4). The toner concentration sensor 27 is connected to a control portion 59 (see FIG. 1) provided at a predetermined position in the image forming apparatus 100.

The toner concentration sensor 27 detects magnetic permeability of the developer in the development container 20, and transmits the detection result to the control portion 59. Based on the detection result, the control portion 59 determines the toner concentration in the developer (a mix ratio of toner to carrier in developer; T/C), and determines whether or not to supply toner. The closer the toner concentration is to a reference value (e.g., 6%), the more suitably the toner has been stirred. The control portion 59 controls rotation of the first stirring conveyance member 25, rotation of the second stirring conveyance member 26, and supply of toner such that the toner concentration approaches the reference value.

As shown in FIG. 2, the toner supply portion 32 is provided on a side surface of the development container 20 with respect to the axial direction. The toner supply portion 32 includes a supply port 58 and a toner supply path 34. The supply port 58 opens at an upper part of the toner supply portion 32. The supply port 58 is connected to the toner container 4a (see FIG. 1). The toner supply path 34 extends downward from the supply port 58, to communicate with the stirring conveyance chamber 21 from an upstream side with respect to the developer conveyance direction (see FIG. 4). The toner stored in the toner container 4a passes through the supply port 58 and the toner supply path 34 to be supplied to the stirring conveyance chamber 21.

In supplying the toner, the control portion 59 transmits a control signal to a toner supply motor (unillustrated). According to this control signal, the toner supply motor supplies the toner in each of the toner container 4a to 4d through the toner supply portion 32 (see FIG. 2) into the development container 20. At this time, while detecting the toner concentration in the developer inside the development container 20 by means of the toner concentration sensor 27, the control portion 59 supplies the toner by controlling the toner supply motor such that the detected toner concentration will approach the predetermined reference value (6%).

Figure 4:
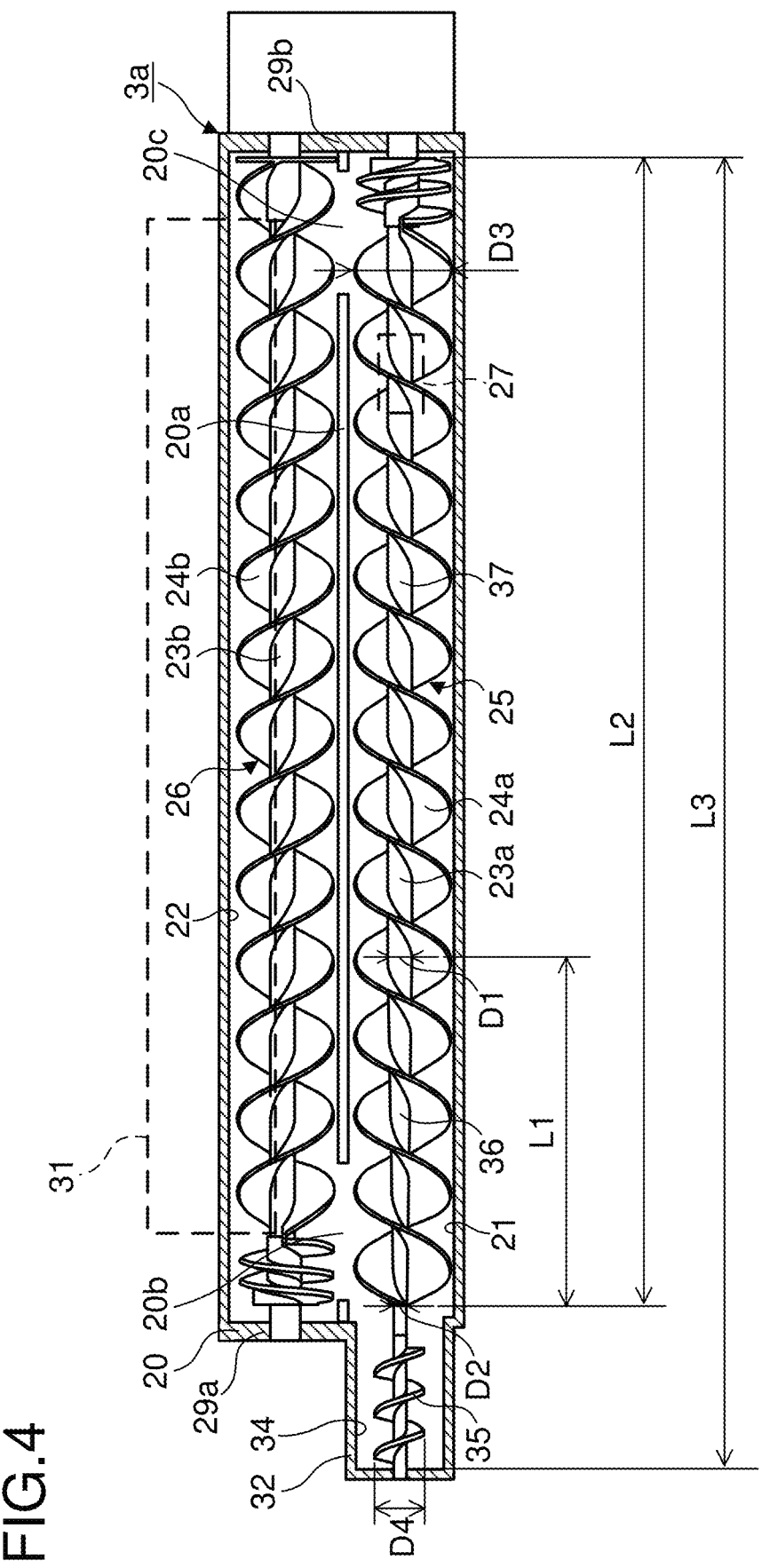
FIG. 4 is a plan sectional view showing a section of a stirring portion of the developing device 3a, taken by cutting the developing device 3a along line A-A shown in FIG. 3.

Next, a detailed description will be given of a configuration of a stirring portion of the developing device 3a. FIG. 4 is a plan sectional view showing a section of the stirring portion of the developing device 3a, taken by cutting the developing device 3a along line A-A in FIG. 3.

As described above, the partition wall 20a extends in a longitudinal direction of the development container 20 to separate the development container 20 into the stirring conveyance chamber 21 and the supply conveyance chamber 22 to be arranged side by side. As shown in FIG. 4, an end part of the partition wall 20a on one side (a left side in FIG. 4) in the longitudinal direction thereof forms the upstream-side communication portion 20b together with a side wall portion 29b of the development container 20. An end part of the partition wall 20a on the other side (a right side in FIG. 4) in the longitudinal direction thereof forms the downstream-side communication portion 20c together with a side wall portion 29a of the development container 20.

As shown in FIG. 2 and FIG. 4, in the stirring conveyance chamber 21, the first stirring conveyance member 25 is disposed, and, in the supply conveyance chamber 22, the second stirring conveyance member 26 is disposed. The first stirring conveyance member 25 includes a first rotation shaft 23a, a first helical blade 24a (a first stirring blade), and a supply blade 35. The second stirring conveyance member 26 includes a second rotation shaft 23b and a second helical blade 24b (a second stirring blade).

The first rotation shaft 23a is a shaft body having a cylindrical shape extending along the longitudinal direction (a conveyance direction of the developer) of the development container 20. The first rotation shaft 23a extends close to opposite end parts of the development container 20 in the axial direction thereof. An upstream-side end part of the first rotation shaft 23a with respect to the developer conveyance direction protrudes outward form the stirring conveyance chamber 21 in an axial direction of the first rotation shaft 23a, and is located inside the toner supply path 34.

The first rotation shaft 23a includes a tapered portion 36 and a straight portion 37. The tapered portion 36 and the straight portion 37 are portions of the first rotation shaft 23a that are next to each other in the axial direction of the first rotation shaft 23a. The tapered portion 36 is located between an upstream-side end part and a center part of the first rotation shaft 23a with respect to the developer conveyance direction (preferably at a position that overlaps with the upstream-side communication portion 20b with respect to the developer conveyance direction).

The tapered portion 36 has a tapered shape, with its shaft diameter increasing from upstream to downstream in the developer conveyance direction in the stirring conveyance chamber 21. A shaft diameter D1 of a downstream-side end part of the tapered portion 36 is equal to or larger than 1.2 times but equal to or smaller than 1.5 times a shaft diameter D2 of an upstream-side end part of the tapered portion 36 in the developer conveyance direction.

The straight portion 37 abuts on the downstream-side end part of the tapered portion 36 with respect to the developer conveyance direction. The straight portion 37 has a shaft diameter that is equal to the shaft diameter D1 of the downstream-side end part of the tapered portion 36 with respect to the developer conveyance direction and that is constant without varying toward the downstream side in the developer conveyance direction.

A length L1 of the tapered portion 36 in an axial direction thereof is equal to or longer than 0.25 times but equal to or shorter than 0.9 times an entire length L3 of the first rotation shaft 23a. Preferably, the length L1 of the tapered portion 36 in the axial direction thereof is equal to or longer than 0.25 times but equal to or shorter than 0.95 times (more preferably equal to or longer than 0.4 times but equal to or shorter than 0.6 times) a length L2 of such part of the first rotation shaft 23a as is located inside the stirring conveyance chamber 21 in the axial direction thereof.

The first helical blade 24a is formed on an outer circumferential surface of the first rotation shaft 23a. The first helical blade 24a is formed integrally with the first rotation shaft 23a, and is formed in a helical shape with a predetermined pitch in the axial direction. The first helical blade 24a extends, with respect to the developer conveyance direction, in the stirring conveyance chamber 21, from a position overlapping with the upstream-side communication portion 20b to a position overlapping with the downstream-side communication portion 20c.

An outer diameter D3 of the first helical blade 24a is equal to or larger than 1.5 times but equal to or smaller than 1.8 times (preferably equal to or larger than 1.6 times but equal to or smaller than 1.7 times) the shaft diameter D1 of the downstream-side end part of the tapered portion 36.

The supply blade 35 is formed on the outer circumferential surface of such part of the first rotation shaft 23a as is located inside the toner supply path 34. The supply blade 35 is formed integrally with the first rotation shaft 23a, and is formed in a helical shape with a predetermined pitch in the axial direction. The supply blade 35 is wound in a direction reverse to a direction in which the first helical blade 24a is wound. An amount of toner that the supply blade 35 can convey per pitch is smaller than an amount of developer that such part of the first helical blade 24a as is located at the upstream-side end part of the tapered portion 36 in the developer conveyance direction can convey per pitch. Specifically, the pitch of the supply blade 35 is smaller than the pitch of the first helical blade 24a, and an outer diameter D4 of the supply blade 35 is smaller than the outer diameter D3 of the first helical blade 24a.

A shaft diameter of the second rotation shaft 23b is constant having a value that is equal to or larger than 0.9 times but equal to or smaller than 1.1 times the shaft diameter D1 of the downstream-side end part of the tapered portion 36 over an entire region in the axial direction. That is, the shaft diameter of the second rotation shaft 23b is larger than the shaft diameter D2 of the upstream-side end part of the tapered portion 36. The second helical blade 24b is formed on an outer circumferential surface of the second rotation shaft 23b. The second helical blade 24b is formed integrally with the second rotation shaft 23b, and is formed in a helical shape with a predetermined pitch in the axial direction. An outer diameter of the second helical blade 24b is equal to the outer diameter D3 of the first helical blade 24a. The second helical blade 24b is wound in a direction reverse to the direction in which the first helical blade 24a is wound. The second helical blade 24b extends, with respect to the developer conveyance direction, in the stirring conveyance chamber 21, from a position overlapping with the upstream-side communication portion 20b to a position overlapping with the downstream-side communication portion 20c.

As the first stirring conveyance member 25 and the second stirring conveyance member 26 rotate, the developer inside the development container 20 is stirred by the first helical blade 24a and the second helical blade 24b while circulating from the stirring conveyance chamber 21 to the upstream-side communication portion 20b, to the supply conveyance chamber 22, and to the downstream-side communication portion 20 (see FIG. 2). Meanwhile, the developer inside the supply conveyance chamber 22 is supplied to the development roller 31.

As described previously, the first rotation shaft 23a has the tapered portion 36, and thus a volume of the stirring conveyance chamber 21 is smaller from upstream to downstream. That is, an amount of developer that the first stirring conveyance member 25 can convey gradually decreases from upstream to downstream in the developer conveyance direction. Thus, the developer inside the stirring conveyance chamber 21 is pushed back upstream while it is conveyed downstream. As a result, the developer is sufficiently stirred inside the stirring conveyance chamber 21, and the sufficiently stirred developer is conveyed into the supply conveyance chamber 22. Accordingly, it is possible to provide the developing device 3a that is capable of suppressing insufficient stirring of the developer inside the development container 20.

Incidentally, there is a conventional image forming apparatus configured such that volumes of a stirring conveyance chamber and a supply conveyance chamber themselves without stirring conveyance members are smaller from upstream to downstream in a developer conveyance direction and that diameters of helical blades of the stirring conveyance members (a first stirring conveyance member and a second stirring conveyance member) are smaller from upstream to downstream in the developer conveyance direction. In such an image forming apparatus, amounts of developer that the stirring conveyance members can convey sharply decrease from upstream to downstream in the developer conveyance direction. This prevents smooth conveyance of the developer, and the developer may stagnate, around downstream-side end parts of the stirring conveyance members (around communication portions that establish communication between the stirring conveyance chamber and the supply conveyance chamber). Then, around the areas where the developer stagnates, toner may firmly adhere to rotation shafts of the stirring conveyance members, to increase diameters of the rotation shafts to invite so-called shaft thickening.

In contrast, the developing devices 3a to 3d adopt a configuration where the shaft diameter of the first rotation shaft 23a varies in a tapered manner in the tapered portion 36. Further, the outer diameter D3 of the first helical blade 24a is constant, and thus the volume of the stirring conveyance chamber 21 itself excluding the first stirring conveyance member 25 is also constant. As a result, the amount of developer conveyed inside the stirring conveyance chamber 21 gradually decreases from upstream to downstream. Thus, the developer is smoothly conveyed in the stirring conveyance chamber 21, and stagnation of the developer can be suppressed.

Further, the shaft diameter of the second rotation shaft 23b according to the present invention is generally equal to (equal to or larger than 0.9 times but equal to or smaller than 1.1 times) the shaft diameter D1 of the downstream-side end part of the first rotation shaft 23a, and is constant over the entire region in the axial direction. As a result, at the downstream-side communication portion 20c, the amount of developer conveyed is unlikely to change, and stagnation of the developer can be suppressed. Accordingly, as compared with the conventional developing devices described above, the developing devices 3a to 3d of the present invention is capable of suppressing insufficient stirring of the developer while suppressing stagnation of the developer.

Further, the shaft diameter D2 of the upstream-side end part of the tapered portion 36 is smaller than the shaft diameter of the second rotation shaft 23b. As a result, an increased amount of developer is conveyed to flow from the supply conveyance chamber 22 into the stirring conveyance chamber 21 via the upstream-side communication portion 20b, and thus it becomes unlikely for the developer to stagnate at the upstream-side communication portion 20b.

Further, as described above, the amount of toner that the supply blade 35 can convey per pitch is smaller than the amount of developer that such part of the first helical blade 24a as is located at the upstream-side end part of the tapered portion 36 in the developer conveyance direction can convey per pitch. As a result, when the toner supplied afresh flows from the toner supply path 34 into the stirring conveyance chamber 21, it is possible to suppress reduction of the amount of toner (developer) conveyed, and to make it unlikely for the developer to stagnate. Further, as described above, the outer diameter D4 of the supply blade 35 is smaller than the outer diameter D3 of the first helical blade 24a. As a result, the toner conveyed by the supply blade 35 into the stirring conveyance chamber 21 is likely to be conveyed to an inner side of the first helical blade 24a in a radial direction thereof. This makes it unlikely for the toner to stagnate in the upstream-side end part of the stirring conveyance chamber 21, and thus insufficient stirring of the toner can be suppressed.

Figure 5:
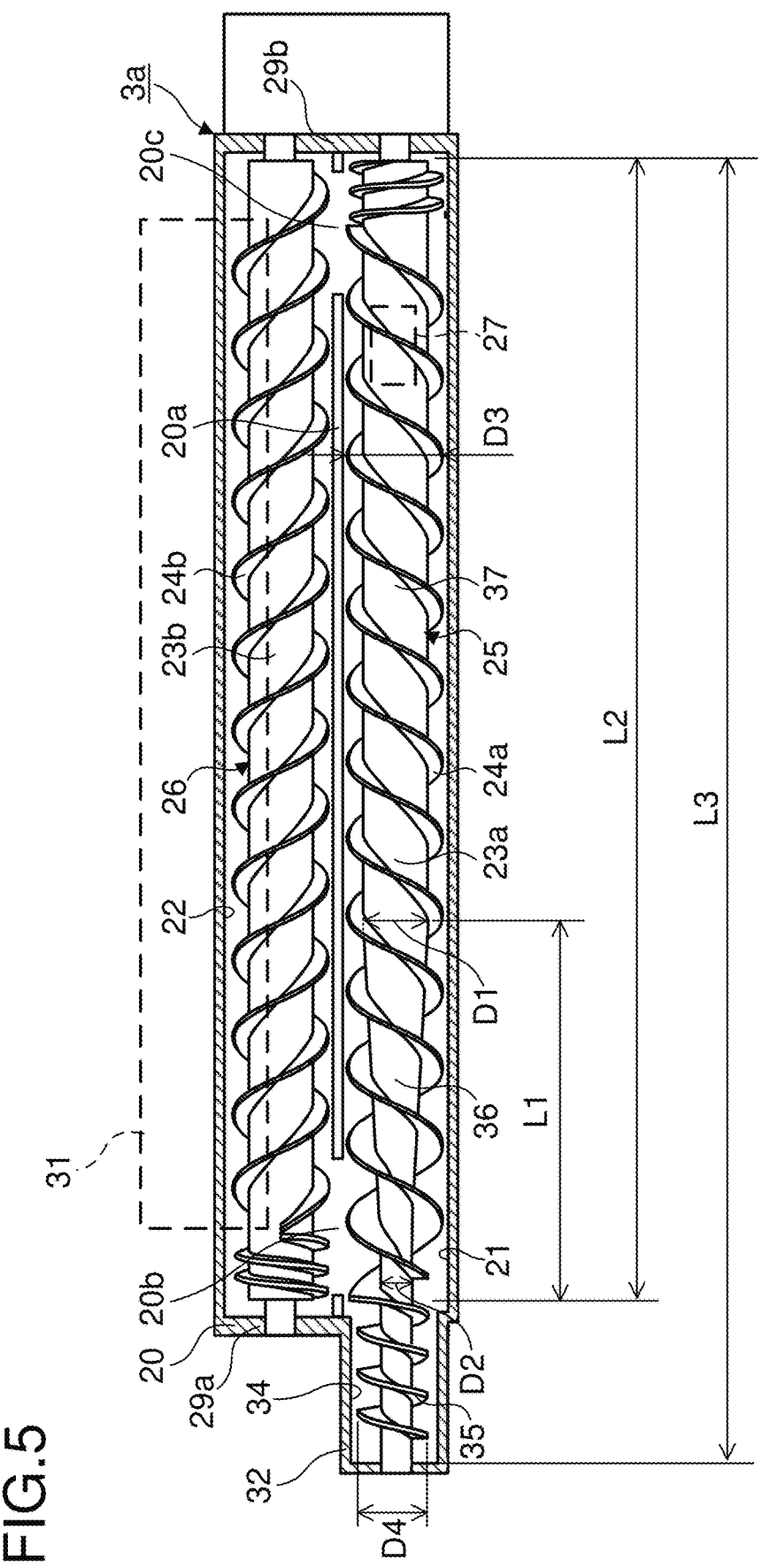
FIG. 5 is a plan view showing a modified example of the developing device 3a of the present invention.

Note that, in the first stirring conveyance member 25 of the above embodiment, as shown in FIG. 5, the shaft diameter of the first rotation shaft 23a can be formed relatively large. In this case, the shaft diameter D1 of the downstream-side end part of the tapered portion 36 is equal to or larger than 1.5 times but equal to or smaller than 2.2 times the shaft diameter D2 of the upstream-side end part of the tapered portion 36 in the developer conveyance direction. Further, in this case, the outer diameter D3 of the first helical blade 24a is equal to or larger than 1.01 times but equal to or smaller than 1.05 times (preferably equal to or larger than 1.02 times but equal to or smaller than 1.04 times) the shaft diameter D1 of the downstream-side end part of the tapered portion 36.

Figure 6:
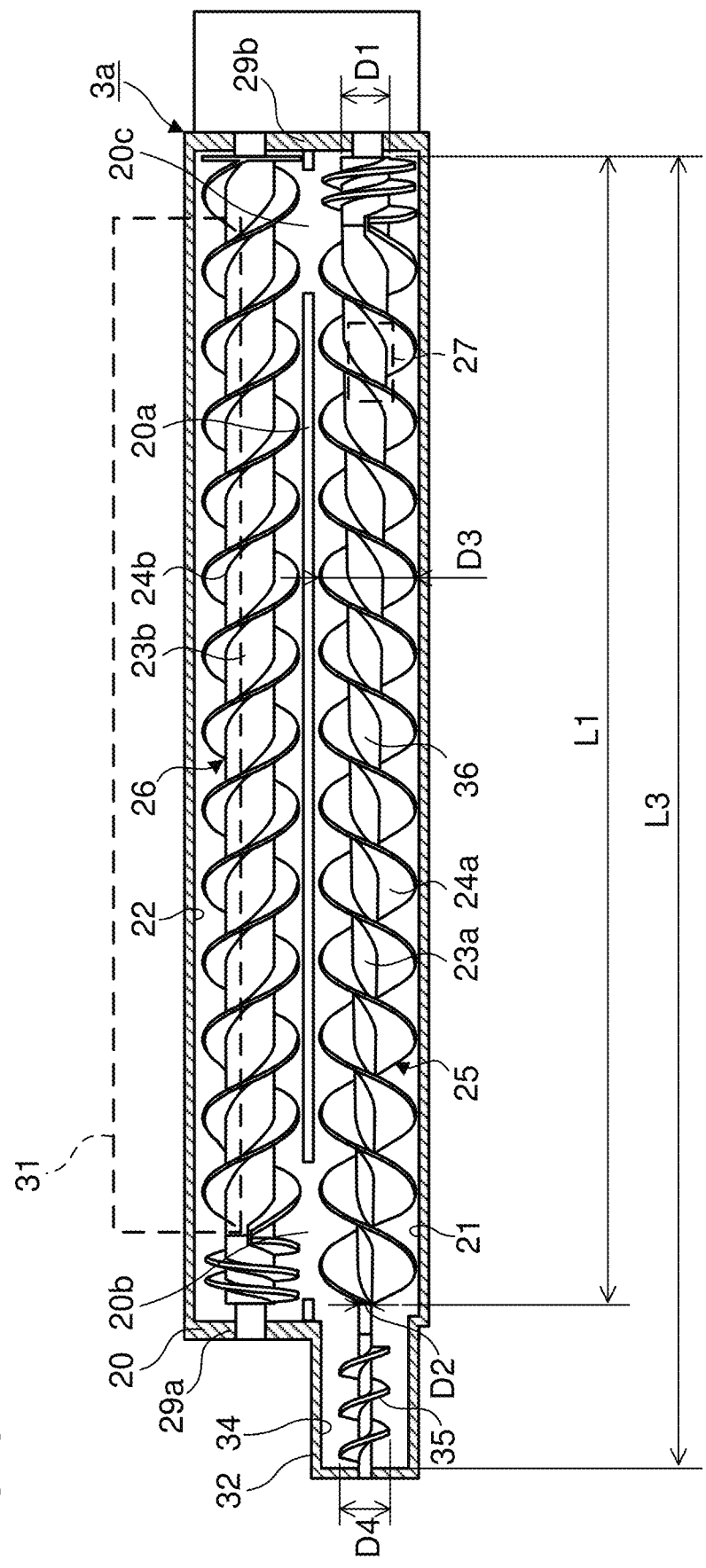
FIG. 6 is a plan view showing another modified example of the developing device 3a of the present invention.

Further, as shown in FIG. 6, in the first stirring conveyance member 25, a configuration can be adopted where the tapered portion 36 is provided over an entire region of the first rotation shaft 23a in the axial direction thereof. In this case, the first stirring conveyance member 25 is not provided with the straight portion 37 described above. With this configuration, the shaft diameter of the first rotation shaft 23a increases more gradually from upstream to downstream in the developer conveyance direction. That is, the amount of developer that the first stirring conveyance member 25 can convey is reduced more gradually from upstream to downstream in the developer conveyance direction, and this helps suppress stagnation of the developer more suitably.

Incidentally, in the development container 20, in which the developer is stored, small spaces are formed in places by stagnation of air. When the toner is fed into the development container 20 to increase a bulk of the developer (a height of the developer from a bottom surface of the stirring conveyance chamber 21 up to a surface of the developer), air in these small spaces is pressed by the developer, so that air pressure in these small spaces (hereinafter will be referred to simply as "air pressure") rises.

Here, in the conventional developing device 3a (a developing device in which the first rotation shaft 23a does not include the tapered portion 36 described above), the shaft diameter of the first rotation shaft 23a is constant over the region between the opposite ends in the axial direction thereof, and thus, the developer is piled into a bulk with a height that is constant along the axial direction (the developer conveyance direction) of the first rotation shaft 23a. In that case, the small spaces as described above are formed in a small gap between a top surface of the development container 20 (such part of an inner wall surface of the development container 20 as is located above the first rotation shaft 23a and the second rotation shaft 23b) and the surface of the developer. Thus, the small spaces have comparatively small volumes. Accordingly, in the small spaces, a rate of increase of air pressure with respect to an amount of toner supply becomes high, and thus the air pressure is caused to rise comparatively largely by a small amount of toner supply. If a small space having an increased air pressure is caused to communicate with the toner supply path 34 of the development container 20, a discharge airflow is generated to flow backward through the toner supply path 34 toward the toner containers 4a to 4d. Then, the toner supplied from the toner supply path 34 may be caused to scatter by this discharge airflow, or the developer in the development container 20 may be caused to scatter by this discharge airflow, and as a result, the developer may scatter to an outside of the development container 20.

Figure 7:
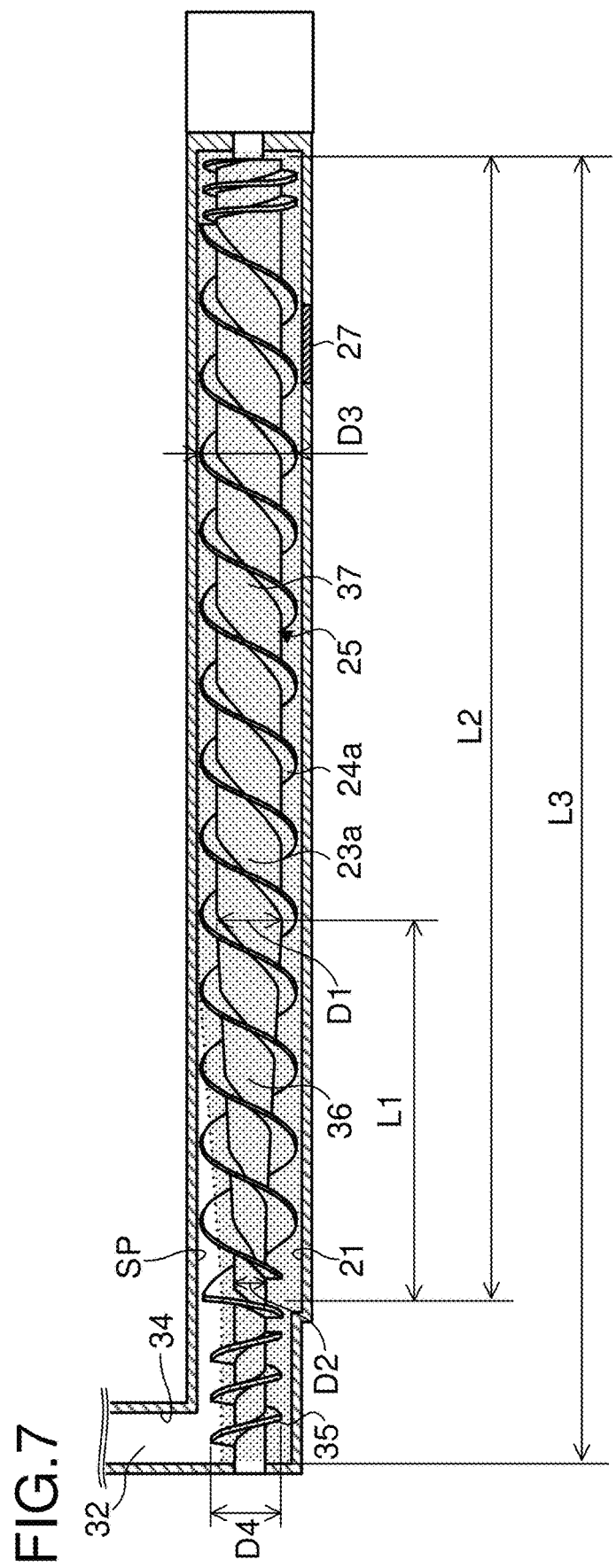
FIG. 7 is a side sectional view of a development container 20 showing a supply conveyance chamber 22.

In contrast, as described previously, in the developing device 3a of the present invention, the first rotation shaft 23a includes the tapered portion 36. As a result, as shown in FIG. 7, the bulk of the developer (indicated by hatching in the figure) in the stirring conveyance chamber 21 becomes gradually higher from upstream to downstream in the developer conveyance direction. As a result, the small spaces SP described above are unlikely to be divided, and there is likely to be formed a single small space SP having a comparatively large volume as compared with in the conventional developing devices 3a to 3d described above.

Then, the rate of increase of air pressure with respect to the amount of toner supply is comparatively low, and thus, even if the small space SP communicates with the toner supply path 34, a discharge airflow is unlikely to be generated. Accordingly, it is possible to suppress scattering of toner to an outside of the developing devices 3a to 3d.

Next, a description will be given of developing devices 3a to 3d according to an image forming apparatus 100 of a second embodiment of the present invention with reference to FIGS. 8 to 10. The following description will focus on differences from the first embodiment, and components similar to their counterparts in the first embodiment are denoted by the same reference signs as in the first embodiment, and overlapping descriptions will be omitted.

Figure 8:
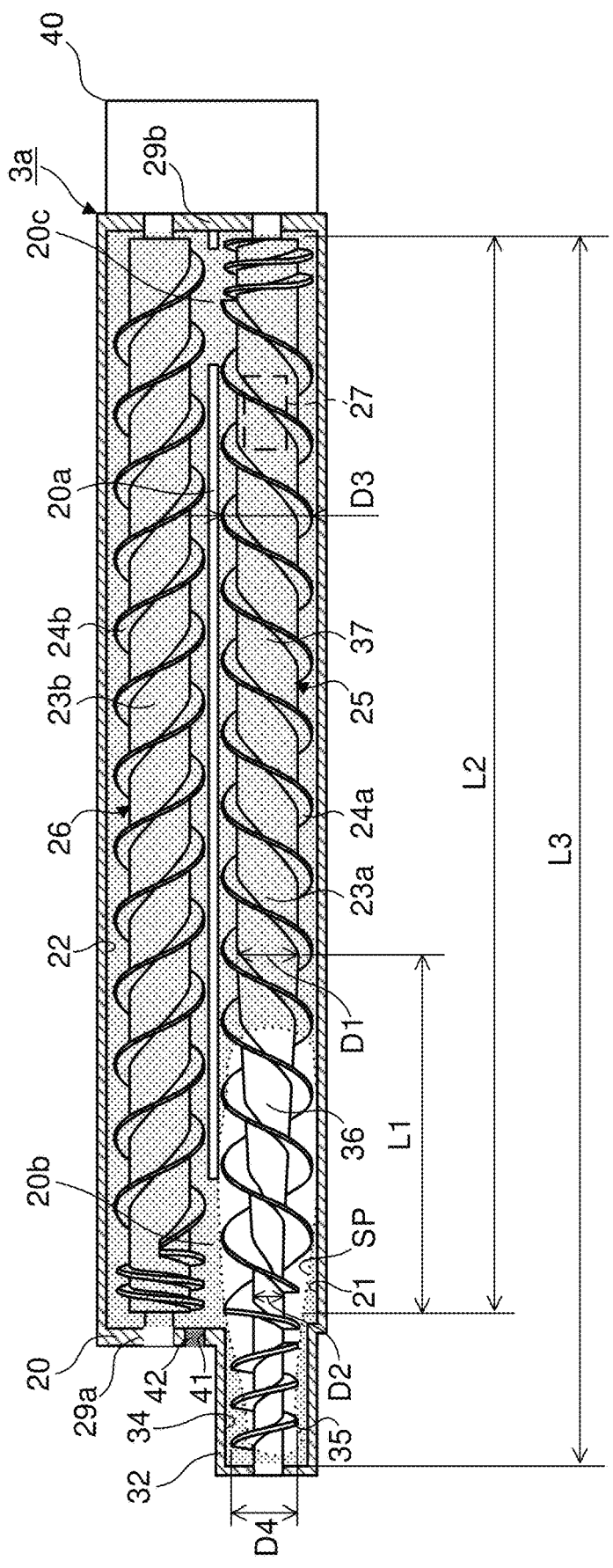
FIG. 8 is a plan sectional view showing a section of a stirring portion of a developing device 3a according to a second embodiment.

FIG. 8 is a plan sectional view showing a section of a stirring portion of the developing device 3a according to the second embodiment. FIG. 9 is a flow chart showing one example of a control flow in a driving portion 40. FIG. 10 is a plan sectional view of the developing device 3a in a state where a reverse rotation mode is executed from the state shown in FIG. 8.

As shown in FIG. 8, to the first rotation shaft 23a and the second rotation shaft 23b, the driving portion 40 is connected. The driving portion 40 is composed of a plurality of gears and a driving source such as a motor. The driving portion 40 transmits rotation driving force to the first rotation shaft 23a and the second rotation shaft 23b, and thereby causes the first rotation shaft 23a and the second rotation shaft 23b to rotate. The driving portion 40 is connected to the control portion 59 (see FIG. 1).

The control portion 59 controls the driving portion 40. The control portion 59 can execute a forward rotation mode and a reverse rotation mode. In the forward rotation mode selected during execution of a print job, the driving portion 40 gives rotation driving force in a forward rotation direction to the first rotation shaft 23a and the second rotation shaft 23b. During execution of the forward rotation mode, the developer is conveyed inside the development container 20 in the developer conveyance direction (in a counterclockwise direction in FIG. 8). In the reverse rotation mode, the driving portion 40 gives rotation driving force in a reverse rotation direction to the first rotation shaft 23a and the second rotation shaft 23b. During execution of the reverse rotation mode, the developer is conveyed inside the development container 20 in a direction (in a clockwise direction in FIG. 8) that is reverse to the developer conveyance direction.

Figure 9:
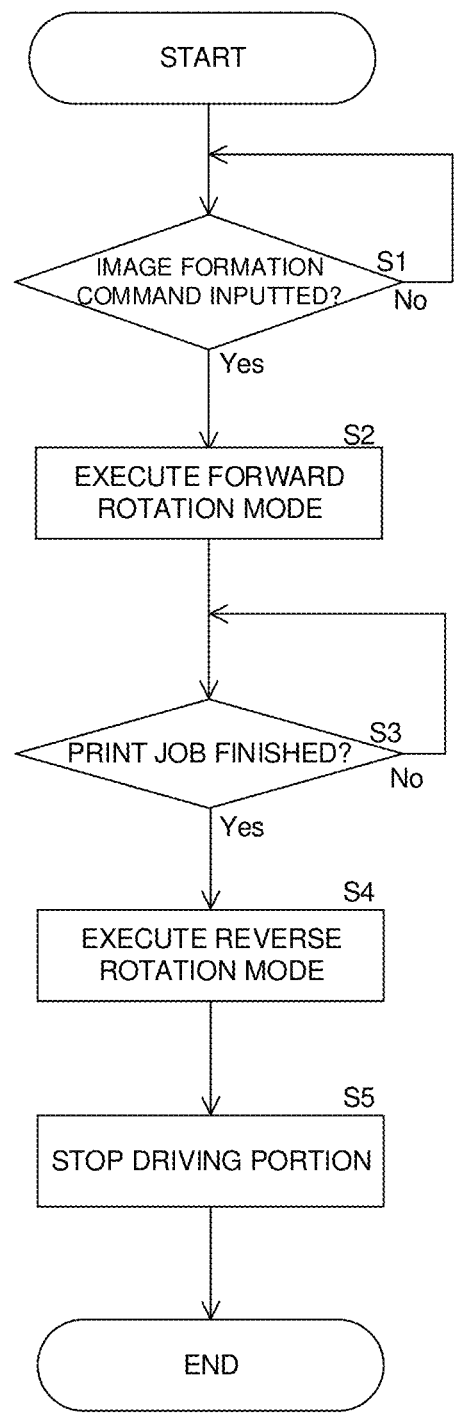
FIG. 9 is a flow chart showing one example of a control flow in a driving portion 40.

As shown in FIG. 9, the control portion 59 first determines whether or not an image formation command has been inputted from a host device such as a personal computer (step S1). In a case where no image formation command has been inputted (No in step S1), no image formation is performed, and a standby state continues to be maintained until an image formation command is inputted. When an image formation command is inputted (Yes in step S1), the forward rotation mode described above is executed (step S2).

Next, it is determined whether or not a print job has been finished (Step S3). In a case where the print job has not been finished (No in step S1), the forward rotation mode continues to be executed. When it is determined that the print job has been finished (Yes in step S3), the forward rotation mode is finished, and the reverse rotation mode is executed (a direction of the rotation driving force transmitted to the first rotation shaft 23a and the second rotation shaft 23b is changed from the forward rotation direction to the reverse rotation direction) (step S4). After the reverse rotation mode is executed for a predetermined period of time, the driving portion 40 is stopped, and the transmission of the rotation driving force to the first rotation shaft 23a and the second rotation shaft 23b is stopped (step S5). Then, the control of the driving portion 40 is finished.

Also in the present embodiment, as in the first embodiment, a small space SP is formed around the tapered portion 36 (see FIG. 8). Here, as described previously, by executing the reverse rotation mode on completion of the forward rotation mode, the developer in the development container 20 is conveyed in the direction reverse to the developer conveyance direction. Then, as shown in FIG. 10, the small space SP also moves upstream in the developer conveyance direction (in a direction indicated by a dashed-line white arrow in FIG. 10). As a result, the small space SP expands via the communication portion 20b to around a downstream-side end part of the supply conveyance chamber 22. Then, when the toner is supplied into the development container 20, the rate of increase of inner pressure becomes comparatively low, and thus a discharge airflow as described above is unlikely to be generated.

Figure 10:
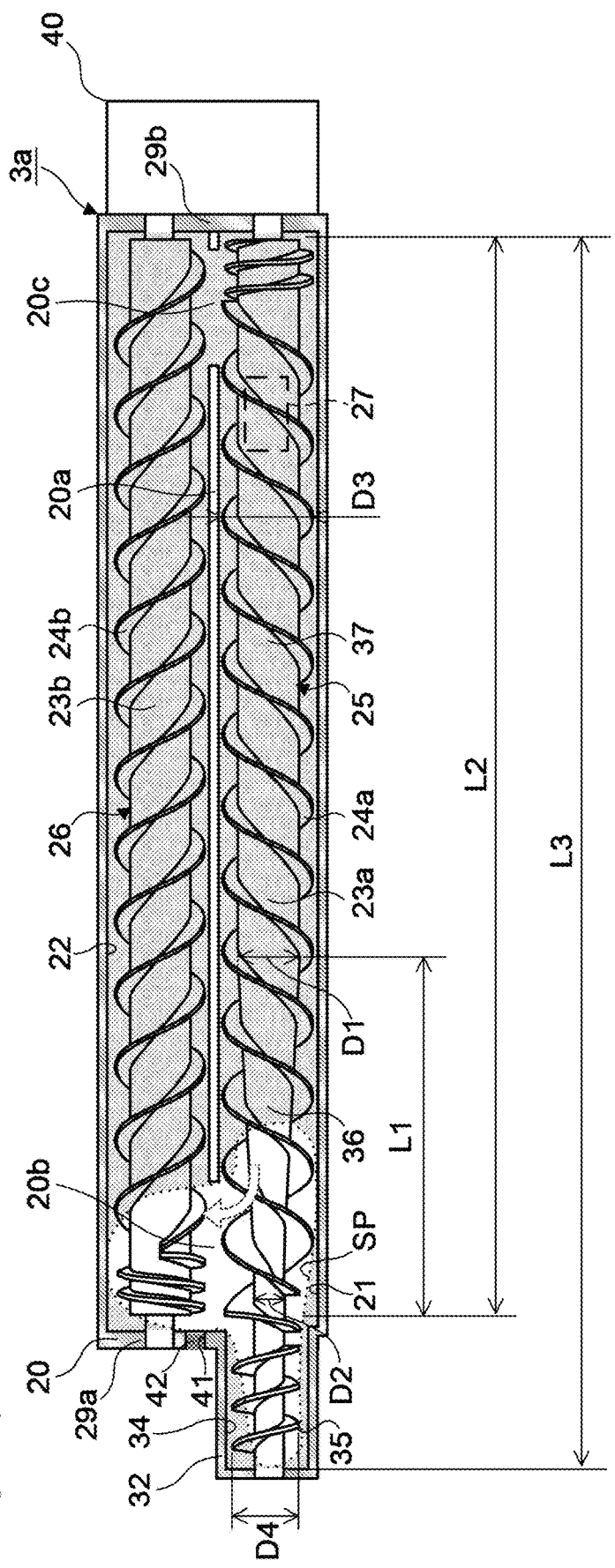
FIG. 10 is a plan sectional view of the developing device 3a in a state where a reverse rotation mode is executed from the state shown in FIG. 8.
Figure 11:
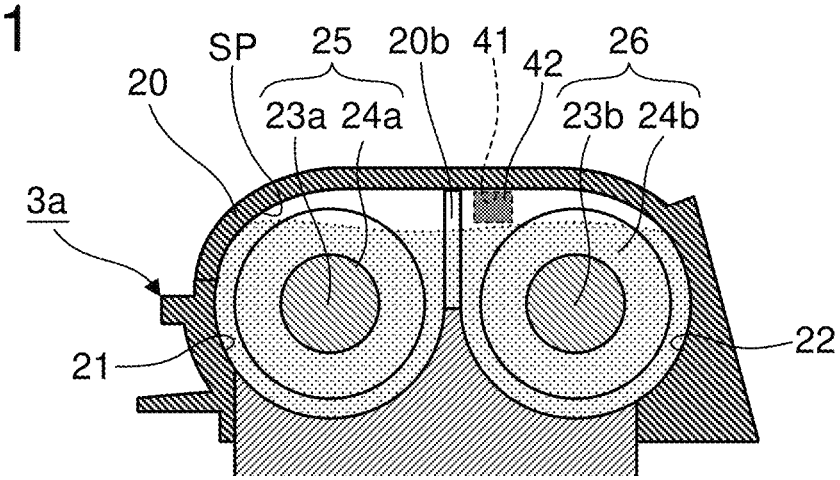
FIG. 11 is a side sectional view of the developing device 3a according to the second embodiment.

Further, as shown in FIGS. 8, 10, and 11, it is preferable that the development container 20 according to the second embodiment have formed therein a exhaust port 41. The exhaust port 41 is a through hole formed in a wall of the supply conveyance chamber 22, and communicates with the outside of the development container 20. The exhaust port 41 is disposed, with respect to the developer conveyance direction, at a position between the downstream-side end part of the supply conveyance chamber 22 and the communication portion 20b. The exhaust port 41 is more preferably disposed, with respect to the developer conveyance direction, at a position that overlaps with the communication portion 20b. It is preferable that the exhaust port 41 be located at a position that overlaps with an uppermost part of the second helical blade 24b (such part of an outer peripheral edge of the second helical blade 24b as is located uppermost) in the height direction, or be located above this uppermost part. Further, it is preferable that the exhaust port 41 be disposed at a position that is closer to the stirring conveyance chamber 21 than the second rotation shaft 23b is with respect to the developer conveyance direction. FIG. 8 illustrates that the exhaust port 41 is open in a side surface of the development container 20, but the exhaust port 41 may instead be open in an upper surface thereof (an upper surface shown in FIG. 11).

With this structure, the small space SP, expanded to the supply conveyance chamber 22 as a result of the execution of the reverse rotation mode, is allowed to communicate with the exhaust port 41. In a case where toner is supplied to the development container 20 with the small space SP communicating with the exhaust port 41, air in the small space SP flows out to the outside of the development container 20 via the exhaust port 41. This makes it possible to suppress increase of air pressure inside the small space SP, and thus makes it less likely for the discharge airflow to be generated. Further, with the exhaust port 41 located at a position that, with respect to the height direction, overlaps with the uppermost part of the second helical blade 24b, the developer is less likely to flow into the exhaust port 41. Accordingly, it is possible to suppress outflow of the developer via the exhaust port 41 to the outside of the development container 20. Further, with the exhaust port 41 located closer to the stirring conveyance chamber 21 than the second rotation shaft 23b is with respect to the developer conveyance direction, the small space SP is more likely to communicate with the exhaust port 41.

Further, as described above, the exhaust port 41 is located at a position, with respect to the developer conveyance direction, between the downstream-side end part of the supply conveyance chamber 22 and the communication portion 20b. This arrangement makes a distance comparatively short between the tapered portion 36 and the exhaust port 41 with respect to the developer conveyance direction. As a result, the small space SP, when expanded to the supply conveyance chamber 22, is more likely to communicate with the exhaust port 41. Thereby, it is possible, while making a period of time for executing the reverse rotation mode comparatively short, to more surely cause the small space SP to communicate with the exhaust port 41, and thus to effectively suppress generation of the discharge airflow.

Further, it is preferable that a filter 42 be disposed at the exhaust port 41. The filter 42, while securing ventilation between inside and outside of the development container 20, helps prevent the developer that has flowed into the exhaust port 41 from flowing out to the outside of the development container 20. The filter 42 is preferably formed of a urethane material including a plurality of voids having an open cell structure.

With this structure, even if the developer flows into the exhaust port 41, the developer is stopped by the filter 42. Thus, it is possible to suppress outflow of the developer via the exhaust port 41 to the outside of the development container 20. Furthermore, by forming the filter 42 with a urethane material including a plurality of voids having an open cell structure, it is possible to suppress outflow of the developer with a comparatively simple structure, and thus to suppress increase in production cost.

FIGS. 8 to 10 illustrate the first rotation shaft 23a of the present embodiment that is configured by including the straight portion 37, but this is not meant as a limitation. For example, as in the first embodiment, it is possible to adopt a configuration, as shown in FIG. 6, that does not include the straight portion 37 and in which the tapered portion 36 is provided over the entire region of the first rotation shaft 23a in the axial direction thereof.

Further, the driving portion 40 of the present embodiment is composed of a plurality of gears and a driving source such as a motor, but instead of providing the driving source, driving force of the main motor (unillustrated) incorporated in the image forming apparatus 100 may be transmitted to the first rotation shaft 23a and the second rotation shaft 23b.

Hereinafter, effects of the present invention will be described in more detail through examples.

EXAMPLES

We conducted a study of difference that the presence/absence of the tapered portion 36 would cause in toner concentration in the developer inside the development container 20. Experiments were conducted by the following method: with the developing device 3a shown in FIG. 2 incorporated in the image forming apparatus 100 (a color printer) as shown in FIG. 1, development operations were performed, and the toner concentration (%) in the stirring conveyance chamber 21 after toner supply was measured. Further, as a comparative example, regarding a developing device 3a incorporating a first stirring conveyance member 25 having a first rotation shaft 23a of which a shaft diameter is constant along its longitudinal direction, the concentration of toner after toner supply was measured in the same manner as the present invention.

In the first stirring conveyance member 25 of the comparative example, the first rotation shaft 23a had a shaft diameter of 8 mm, and the first helical blade 24a was double-threaded, with an outer diameter of 13.5 mm and a pitch of 30 mm.

In contrast, in the first stirring conveyance member 25 of the present invention, the first rotation shaft 23a had a shaft diameter of 6 mm (the shaft diameter D2) at the upstream-side end part of the tapered portion 36 in the developer conveyance direction, and 8 mm (the shaft diameter D1) at the downstream-side end part of the tapered portion 36 in the developer conveyance direction. The outer diameter D3 of the first helical blade 24a was 13.5 mm. The number of threads of the first helical blade 24a was two, and the pitch of the first helical blade 24a was 30 mm.

The experiments were conducted five times (N1 to N5), and an average value of measured toner concentrations (%) was calculated. As described previously, the closer to the reference value the toner concentration is, the more suitably the toner has been stirred in the development container 20. With 6% as the reference value for the toner concentration, a difference value between this difference value and the average value mentioned just above was calculated. Then, comparison and examination were performed with respect to the difference value of the present invention and the difference value of the comparative example. The results are shown in Table 1.

TABLE 1

| | N1 (%) | N2 (%) | N3 (%) | N4 (%) | N5 (%) | Average Value (%) | Difference Value (%) |
|---|---|---|---|---|---|---|---|
| Comparative Example | 7.1 | 7.3 | 6.8 | 6.6 | 7 | 6.96 | 0.96 |
| Present Invention | 6.1 | 6.3 | 6.5 | 5.9 | 6.1 | 6.18 | 0.18 |

As shown in Table 1, in the developing device 3a of the present invention, the difference value of the toner concentration was smaller than the difference value of the toner concentration in the comparative example. Thus, in the developing device 3a of the present invention, the toner concentration is closer to 6% and the toner in the development container 20 is stirred more suitably than in the developing device 3a of the comparative example. Accordingly, the developing device 3a according to the present invention is capable of suppressing insufficient stirring of the developer in the development container 20 better than the developing device 3a of the comparative example (conventional configuration).

The embodiments described above are in no way meant to limit the present invention, which thus allows for many modifications and variations within the spirit of the present invention. For example, the present invention is applicable not only to the tandem type color printer as shown in FIG. 1 but also to various image forming apparatuses using the two-component developing method, such as digital or analog monochrome copiers, monochrome printers, color copiers, and facsimiles.

INDUSTRIAL APPLICABILITY

The present invention is usable in a developing device provided with a stirring conveyance member that conveys developer while stirring the developer. By using this developing device, it is possible to provide an image forming apparatus capable of suppressing poor image formation and scattering of toner inside the apparatus main body.

The invention claimed is:
1. A developing device, comprising:
a development container that includes a first conveyance chamber, a second conveyance chamber that is disposed side by side with the first conveyance chamber with a partition portion therebetween, and a communication portion that establishes communication between the first conveyance chamber and the second conveyance chamber at opposite end part sides of the partition portion in a longitudinal direction thereof, and that stores a developer including a toner;
a first stirring conveyance member that includes a first rotation shaft rotatably supported in the first conveyance chamber and a first stirring blade formed on an outer circumferential surface of the first rotation shaft, and that stirs and conveys the developer in the first conveyance chamber;
a second stirring conveyance member that includes a second rotation shaft rotatably supported in the second conveyance chamber and a second stirring blade formed on an outer circumferential surface of the second rotation shaft, and that stirs and conveys the developer in the second conveyance chamber; and
a developer carrier that is opposed to the second stirring conveyance member, and that carries on a surface thereof the toner in the second conveyance chamber, wherein
the first rotation shaft includes: a tapered portion that is provided in a region, with respect to a developer conveyance direction, from an upstream-side end part to a central part of the first rotation shaft, and of which a shaft diameter increases toward a downstream side in the developer conveyance direction in the first conveyance chamber; and a straight portion that is provided in a region, with respect to the developer conveyance direction, from a downstream-side end part of the tapered portion to a downstream-side end part of the first rotation shaft, and of which a shaft diameter is equal to a shaft diameter of the downstream-side end part of the tapered portion,
the development container includes a toner supply path that communicates with an outside of the development container, and that communicates with the first conveyance chamber from an upstream side of the first conveyance chamber with respect to the developer conveyance direction,
the first conveyance member includes a supply blade that is formed on the outer circumferential surface of such part of the first rotation shaft as extends inside the toner supply path, and that conveys the toner in the toner supply path into the first conveyance chamber, and
an amount of the toner conveyed by the supply blade per pitch is smaller than an amount of the developer conveyed by such part of the first stirring blade as is located at an upstream-side end part of the tapered portion in the developer conveyance direction per pitch.
2. The developing device according to claim 1, wherein,
with respect to the developer conveyance direction, a shaft diameter of a downstream-side end part of the tapered portion is equal to or larger than 1.2 times but equal to or smaller than 2.5 times a shaft diameter of an upstream-side end part of the tapered portion.

3. The developing device according to claim 1, wherein
a length of the tapered portion in an axial direction thereof is equal to or longer than 0.25 times an entire length of the first rotation shaft.

4. The developing device according to claim 1, wherein
an outer diameter of the supply blade is smaller than an outer diameter of the first stirring blade.

5. The developing device according to claim 1, wherein
a shaft diameter of the second rotation shaft is, over an entire region of the second rotation shaft in an axial direction thereof, equal to or larger than 0.9 times but equal to or smaller than 1.1 times a shaft diameter of a downstream-side end part of the first rotation shaft in the developer conveyance direction.

6. The developing device according to claim 1, wherein
the developer is a two-component developer including the toner and a magnetic carrier.

7. The developing device according to claim 1, further comprising:
a driving portion that is connected to the first rotation shaft and the second rotation shaft, and that gives rotation driving force to the first rotation shaft and the second rotation shaft; and
a control portion that controls the driving portion, wherein
the control portion is capable of executing: a forward rotation mode in which rotation driving force in a forward rotation direction is given to the first rotation shaft and the second rotation shaft so as to convey the developer in the developer conveyance direction; and a reverse rotation mode in which rotation driving force in a reverse rotation direction is given to the first rotation shaft and the second rotation shaft so as to convey the developer in a direction reverse to the developer conveyance direction, and the control portion executes the reverse rotation mode when the forward rotation mode is finished.

8. The developing device according to claim 7, further comprising:
an exhaust port that is provided at a position located, with respect to the developer conveyance direction, between a downstream-side end part of the second conveyance chamber and the communication portion that is located on a downstream side of the second conveyance chamber, the exhaust port communicating with an outside of the development container, wherein
the exhaust port is located at a position that overlaps with an uppermost part of an outer peripheral edge of the second stirring blade or at a position that is above the uppermost part of the outer peripheral edge of the second stirring blade.

9. The developing device according to claim 8, further comprising:
a filter that is disposed in the exhaust port, that is capable of suppressing outflow of the developer through the exhaust port, and that has air permeability.

10. The developing device according to claim 9, wherein
the filter is formed of a urethane material that has a plurality of voids having an open cell structure.

11. The developing device according to claim 7, wherein
the communication portion includes an upstream-side communication portion located on an upstream side in the developer conveyance direction in the first conveyance chamber, or a downstream-side communication portion located on a downstream side in the developer conveyance direction in the first conveyance chamber, and
the tapered portion overlaps with the upstream-side communication portion with respect to the developer conveyance direction.

12. An image forming apparatus, comprising:
the developing device according to claim 1; and
an image carrier that is opposed to the developer carrier, and that carries on a surface thereof the toner supplied from the developer carrier.

13. A developing device, comprising:
a development container that includes a first conveyance chamber, a second conveyance chamber that is disposed side by side with the first conveyance chamber with a partition portion therebetween, and a communication portion that establishes communication between the first conveyance chamber and the second conveyance chamber at opposite end part sides of the partition portion in a longitudinal direction thereof, and that stores a developer including a toner;
a first stirring conveyance member that includes a first rotation shaft rotatably supported in the first conveyance chamber and a first stirring blade formed on an outer circumferential surface of the first rotation shaft, and that stirs and conveys the developer in the first conveyance chamber;
a second stirring conveyance member that includes a second rotation shaft rotatably supported in the second conveyance chamber and a second stirring blade formed on an outer circumferential surface of the second rotation shaft, and that stirs and conveys the developer in the second conveyance chamber; and
a developer carrier that is opposed to the second stirring conveyance member, and that carries on a surface thereof the toner in the second conveyance chamber,
the communication portion including an upstream-side communication portion located on an upstream side in the developer conveyance direction in the first conveyance chamber, or a downstream-side communication portion located on a downstream side in the developer conveyance direction in the first conveyance chamber,
the developing device further comprising:
a driving portion that is connected to the first rotation shaft and the second rotation shaft, and that gives rotation driving force to the first rotation shaft and the second rotation shaft; and
a control portion that controls the driving portion, wherein
the first rotation shaft includes a tapered portion that is provided over an entire region of the first rotation shaft in an axial direction thereof, and of which a shaft diameter increases toward a downstream side in the developer conveyance direction in the first conveyance chamber, and
the control portion is capable of executing: a forward rotation mode in which rotation driving force in a forward rotation direction is given to the first rotation shaft and the second rotation shaft so as to convey the developer in the developer conveyance direction; and a reverse rotation mode in which rotation driving force in a reverse rotation direction is given to the first rotation shaft and the second rotation shaft so as to convey the developer in a direction reverse to the developer conveyance direction, and the control portion executes the reverse rotation mode when the forward rotation mode is finished.

14. The developing device according to claim 13, further comprising:
an exhaust port that is provided at a position located, with respect to the developer conveyance direction, between a downstream-side end part of the second conveyance chamber and the downstream-side communication portion,
wherein
the exhaust port is located at a position that overlaps with an uppermost part of an outer peripheral edge of the second stirring blade or at a position that is above the uppermost part of the outer peripheral edge of the second stirring blade.

* * * * *